United States Patent [19]

Wilson et al.

[11] Patent Number: 4,696,362
[45] Date of Patent: Sep. 29, 1987

[54] RETRACTABLE, LEVER ACTION, SCROLL SEAL FOR A SURFACE EFFECT SHIP

[75] Inventors: Fred W. Wilson, Mt. Airy; Timothy D. Smith, College Park, both of Md.

[73] Assignee: The United States of America as represented by the Secretary of the Navy, Washington, D.C.

[21] Appl. No.: 831,952

[22] Filed: Feb. 24, 1986

[51] Int. Cl.⁴ .............................................. B60V 1/16
[52] U.S. Cl. .................................... 180/116; 180/127
[58] Field of Search ....................... 180/116, 126, 127; 114/67 A

[56] References Cited

U.S. PATENT DOCUMENTS

| | | | |
|---|---|---|---|
| 3,387,685 | 6/1968 | Fresh et al. | 180/119 |
| 3,515,238 | 6/1970 | Knuth et al. | 180/127 |
| 3,550,718 | 12/1970 | Knuth et al. | 180/121 |
| 3,576,231 | 4/1969 | Jung | 180/124 |
| 3,776,360 | 12/1973 | Anders et al. | 180/127 |
| 4,176,729 | 12/1979 | Down | 180/127 |
| 4,303,034 | 12/1981 | Tattersall | 114/67 A |

FOREIGN PATENT DOCUMENTS

| | | | |
|---|---|---|---|
| 1075868 | 7/1967 | United Kingdom | 180/127 |
| 1481011 | 7/1977 | United Kingdom | 180/126 |
| 2027655 | 2/1980 | United Kingdom | 180/127 |

Primary Examiner—John A. Pekar
Attorney, Agent, or Firm—Michael J. Gonet; Luther A. Marsh

[57] ABSTRACT

An improved seal design for a Surface Effect Ship, having an inflatable inner seal member, and outer seal member composed of a pliable sheet material scrollably affixed to the hull fore and aft of the inner seal member. The seal may be retracted for hullborne operation by deflating the inner seal member and scrolling the outer seal member tight to hull. The inner seal member has transverse webbing for stability. The outer seal member is periodically scrolled forward to expose an unworn section to the water surface thereby reducing seal failure due to wear.

38 Claims, 3 Drawing Figures

RETRACTABLE, LEVER ACTION, SCROLL SEAL FOR A SURFACE EFFECT SHIP

BACKGROUND OF THE INVENTION

1. Field of the Invention

The present invention relates generally to an Air Cushion Vehicle, and more specifically to a retractable seal design for a Surface Effect Ship.

2. Description of the Prior Art

An Air Cushion Vehicle (ACV) rides on a cushion of air contained below the ship by a flexible seal depending from the ship's periphery. A Surface Effect Ship (SES), an ACV comprising two sidehulls, a fore seal, and an aft seal, may operate in either the hullborne mode or the air cushion mode. The sidehulls are typically part of a rigid hull structure, similar to a catamaran design, providing buoyancy during hullborne operation, and directional stability during hull-borne and air cushion operation. The fore and aft seals, located at the fore and aft of the ship respectively, extend from one sidehull to the other, thereby completing the air cushion enclosure. Each seal is generally a flexible skirt structure which must contain the air cushion, yet accommodate the waves passing through and/or beneath the seal.

SES seal failure is a persistant problem. It increases the vulnerability of a Navy SES. Further, during high speed air cushion operation, it can cause the platform structure of an SES to "plow-in", damaging the hard structure of the SES and endangering the ship and crew. Seal failure may be caused by air cushion pressure loss, seal deflation, seal sweep-back, and/or seal damage from wear. It is therefore important to control these seal design characteristics.

The seals of an SES operating in open water are subject to high loading and high frequency vibration fatigue. During air cushion operation, an SES may travel across open water at speeds in excess of 100 mph. At these speeds, the waves passing through and/or below each seal generate extremely high loading forces, at high frequency intervals. During hullborne operations, the seals are generally submersed, thereby generating high load drag forces. For these and other reasons, prior seal designs have been subject to high wear, with an expected lifetime of less than 1,000 hours of air cushion operation. Numerous seals and seal systems have been designed to alleviate these problems of drag and wear; all have had limited success.

The most proven seal design is the bag and finger seal, or some variation thereof. A bag and finger seal generally comprises an inflated upper bag affixed to the ship hull, and a series of seal fingers depending therefrom in a parallel configuration (e.g. U.S. Pat. No. 4,176,729). It is the seal fingers which contact the water during air cushion operation, and therefore incur the tremendous wear and drag from incident waves. In addition, the pressure differential across each seal finger, from the air cushion to the ambient air, causes the lower portion of each seal finger to deform into and out of complex shapes at high frequencies. This high frequency "flutter" accelerates the wear. The seal fingers also incur high load drag forces during hullborne operation.

The numerous design variations of the bag and finger seal generally lie in the design of the high wear components, the seal fingers. One design is a seal finger open at its back, into the air cushion, wherein the air cushion inflates each seal finger. This design provides stability while inflated, and rapid deflation upon wave impact, thereby reducing seal drag. Another design is a finger open at the top, wherein each seal finger is in fluid communication with the seal bag, and inflated thereby. This design provides improved ship stability and seakeeping, as a deflated finger may reinflate more quickly from the air bag pressure. A variation of this design is a seal finger further truncated at its bottom, wherein each seal finger may independently collapse when hit by an incident wave, yet quickly reinflate after said wave passes. Each of these designs modifies the drag characteristics during air cushion operation, but does not directly address the problem of wear during air cushion operation nor the problems of drag and wear associated with hullborne operation.

Seal systems designed to reduce the drag forces during hullborne operation are also known. Several seal systems are designed having an entire ACV seal foldably retract up the side of the vehicle (e.g. U.S. Pats. Nos. 3,387,685-Fresh, 3,550,710-Knuth, and 3,776,360-Anders). Other seal systems use multiple, individually retracting cells to provide additional vehicle pitch control (e.g. U.S. Pat. No. 3,515,238-Knuth). These retracting seal systems require undesirable bulky, heavy, and/or complex operating mechanisms and structural supports. They also do not address the problem of wear during air cushion operation.

In addition to the safety aspects of seal failure from wear, seal replacement on SES ships, often weighing more than 1000 tons, is a difficult task. When maintenance is required in rough open water, this task becomes monumental.

Surface effect ships having different fore and aft seal designs present an additional maintenance problem. A bag and finger seal is commonly used as the fore seal. A common aft seal design is the swept back bag seal, comprising one or more inflated lobes depending from the ship hull (two or more depending therefrom in a parallel horizontal configuration), which sweep back relative to the water flow during air cushion operation (e.g. U.S. Pat. No. 4,303,034). As an aft seal exhibits similar high wear and maintenance characteristics, an SES having different fore and aft seals must carry maintenance supplies and equipment for each type of seal. This adds undesirable weight, storage requirements, and expense.

For these and other reasons, the seal designs of the prior art are not entirely satisfactory for SES use, and a need exists for an improved SES seal design.

SUMMARY OF THE INVENTION

It is therefore an object of the present invention to reduce the wear and drag of an SES seal.

It is another object of the present invention to improve the safety of air cushion operation.

It is another object of the present invention to reduce the risk of damage and injury from seal failure due to excessive cushion venting, seal deflation, seal sweepback, and seal damage from wear.

It is another object of the present invention to improve the hullborne operating characteristics of an SES.

It is another object of the present invention to reduce the frequency, expense, and difficulty of SES seal maintenance.

These objects and further advantages are achieved by the present invention, an improved SES seal design having a single, transverse webbed, inflatable inner member, and a retractable, lever action, scrolling outer seal member.

BRIEF DESCRIPTION OF THE DRAWINGS

A more complete appreciation of the invention will become apparent from the following detailed description when considered in conjunction with the accompanying drawings, wherein.

DETAILED DESCRIPTION OF THE PREFERRED EMBODIMENT

Figure 1:
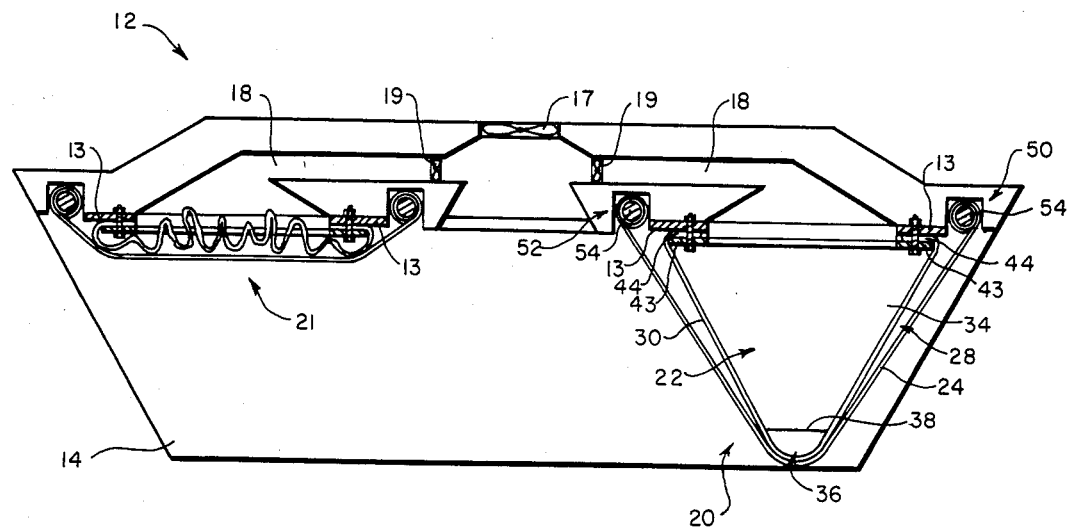
FIG. 1 illustrates the design of an SES having a fore and aft seal of the present invention.

Referring now to the drawings, wherein like reference characters designate like or corresponding parts throughout the several views, FIG. 1 generally illustrates the design and structure of a Surface Effect Ship (SES) 12 having a fore seal 20 and an aft seal 21 of the present invention. FIG. 1 is merely illustrative, as the SES should operate either with both seals deployed (air cushion operation) or with both seals retracted (hullborne operation). However, it is foreseen that an SES may be designed having a fore seal of the present invention in combination with an aft seal of a different design, or vice-versa. Therefore, to demonstrate the independent operation capability of the seal design, the fore seal 20 is shown deployed and the aft seal 21 is shown retracted. Furthermore, as each seal 20, 21 is substantially similar in design and operation, only fore seal 20 will be specifically described herein.

The fore seal 20 generally comprises an inner seal member 22 and an outer seal member 24. The inner seal member 22 is an inflatable structure affixed to, and depending from, the hull 13 of the SES 12. It is further disposed between the sidehulls 14 of the SES 12, and in physical contact therewith. The outer seal member 24 is scrollably affixed to the hull 13 at points fore and aft of the inner seal member 22. The inner seal member is thereby enclosed by the outer seal member 24, the hull 13, and the sidehulls 14, and may be retracted by deflating the inner seal member 22 and scrolling the outer seal member 24 tight to the hull 13. A means for inflating the inner seal member 22 is generally shown as a source of pressurized air 17, valve 19, and conduit system 18.

The inner seal member 22 may be one of numerous shapes and/or designs. The inventive concept encompasses the use of known seal designs, including the inflated bag and finger design and the swept-back, lobedbag design, however, an advantage of the present invention is that the inner seal member 22 may be of very simple design, having no complex shape and/or component requirements.

Figure 2A:
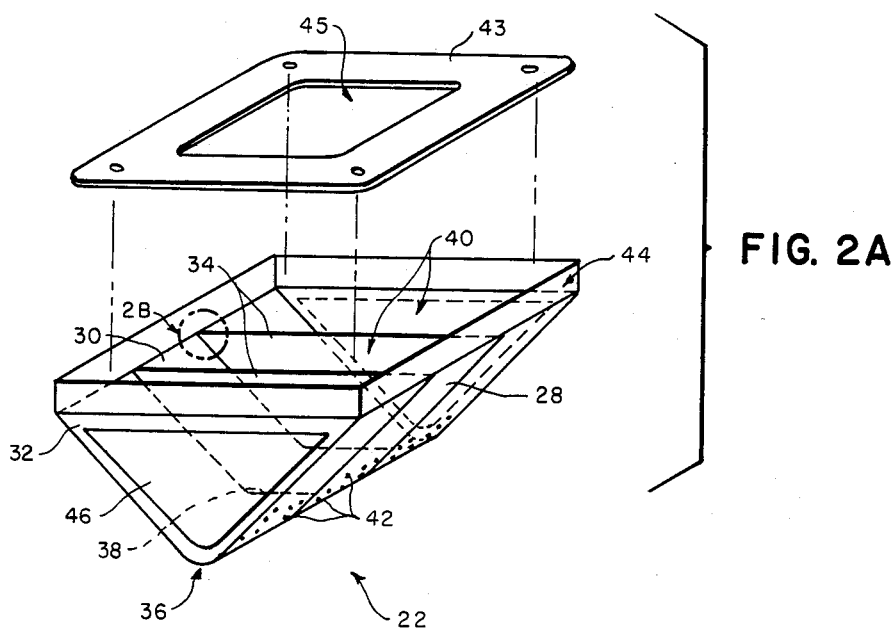
FIGS. 2a and 2b illustrate the preferred embodiment of the inner seal member of the present invention.

FIG. 2a illustrates the preferred embodiment of the inner seal member 22. It comprises a trough, having a fore wall 28 and an aft wall 30, and end cap 32 at each end of the trough, and at least one web 34. The trough is a single folded membrane, having an inverted triangular cross-section, rounded at its lower apex 36. Each end cap 32 is of like triangular geometry. Additionally, each end cap 32, which is pressed against a sidehull 14 during air cushion operation, may be reinforced with a friction bearing member 46.

Each web 34 is of similar triangular geometry, but having a truncated lower apex 38. Each web 34 is affixed to the forewall 28 and aft wall 30, thereby stabilizing the trough structure, segmenting the trough into seal cells 40, and providing a channel for fluid communication between adjacent seal cells 40. The number of webs 34 is determined by the desired structural rigidity, more webs 34 produce greater structural rigidity. This webbed structural design reduces the risk of rupture during air cushion operation, and improves seakeeping by increasing the pitch restoring forces of the seal.

The rounded lower apex 36 of the trough may be perforated to form air lubrication vents 42. During air cushion operation, compressed air will bleed from within the inner seal member 22 to lubricate the interfacing inner seal member 22 and outer seal member 24. Additionally, any water which enters the inner seal member 22 will be blown out.

In the preferred embodiment, each component of the inner seal member 22 is composed of a conventional flexible sheet material (eg rubber, vinyl, etc.), and the components are joined by conventional means. The most preferred material is a neoprene impregnated nylon sheet, and the most prefered method of joining is by gluing and/or sewing. A worn or damaged inner seal member 22 may therefore be easily and inexpensively maintained, repaired, or replaced, even while at sea.

Figure 2B:
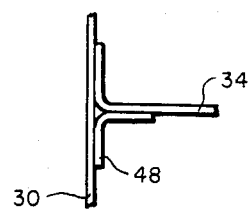

FIG. 2b is a top view of a trough section illustrating the preferred method of affixing the components of the inner seal member 22. The edges of each web 34 are folded to lay flush with fore wall 28 and aft wall 30, and are affixed thereto by conventional means. To strengthen the seam, or joint, a web connecting member 48, preferably composed of like material, may be folded adjacent to this joint and affixed to both the web 34 and trough by conventional means. The end caps 32 may be similarly joined to the trough by folding the edges of each end cap 32 flush with the interior of the trough (or alternatively providing a folded connecting member not shown) and affixing by conventional means. The friction bearing member 46, may also be laminated to the end cap 32 by conventional means.

The inner seal member 22 is affixed to the hull 13 such that it is in fluid communication with conduit system 18. The trough's fore wall 28, aft wall 30, and end caps 32 are extended above each web 34, wherein each seal cell 40 is open at its top, and wherein the trough has a flexible flange 44 about its open, upper periphery. The inner seal member 22 is then affixed to the hull 13 by folding the flexible flange 44 over a framing member 43, which may be affixed to the hull 13 by conventional means (eg. bolting, clamping, etc.). The framing member 43 is preferably a rigid rectangular plate, having a large central opening 45 which alligns with conduit system 18. The prefered method of affixing the inner member assembly to the hull 13 is to bolt the framing member 43 to the hull 13 (See also FIG. 1). The interface between the hull 13 and inner seal member 22 is substantially airtight, as the flange 44 is composed of a pliable material. To insure an airtight fit, a conventional O-ring (not shown) may be inserted between the hull 13 and the inner seal member 22 assembly.

During air cushion operation, the air pressure within the inner seal member 22 is regulated. The control system implemented may be either an active system, such as a wave and/or vertical acceleration system or a passive system, such as a constant pressure system. Both types of systems are generally known. An active system (through eg. probes, not shown), detects when a wave will impact the seal and reduces the internal seal pressure accordingly in anticipation of the compression force exerted by the wave. A passive system monitors the internal seal pressure and admits air into, or vents air from, the inner seal member 22 accordingly.

Referring again to FIG. 1, a simple passive system is illustrated. Valve 19 within conduit system 18 is preset for a specific pressure. When the internal seal pressure drops below this predetermined pressure, compressed air from air source 17 is admitted through valve 19 into the inner seal member 22. When the internal seal pressure exceeds this predetermined pressure, compressed air is emitted through valve 19 to the air cushion beneath the hull 13. Alternatively, the excess air could be vented to the ambient air by an additional conduit system (not shown).

FIG. 1 further illustrates the preferred embodiment of the outer seal member 24. The outer seal member 24 is also composed of a flexible sheet material, preferably the same material as the inner seal member 22, whereby maintenance requirements are further reduced. The outer seal member 24 is affixed to the hull 13 by a fore scroll member 50 and an aft scroll member 52. Each scroll member 50, 52 comprises a roller, rotatably disposed between the sidehulls 14. To reduce the risk of damage from wave impact, the scroll members 50, 52 may be disposed within a recess in the hull 13. One of the scroll members (eg. the aft scroll member 52) is spring loaded by conventional means (eg. mechanical, electrical, hydraulic, etc.), wherein it is biased to scroll up (ie. roll up) the outer seal member 24. The seal 20 is thereby biased in a retracted state. This bias is overcome by inflating the inner seal member 22 with compressed air from air source 17 through valve 19 and conduit system 18. During air cushion operation, the air pressure and spring load are balanced to permit the seal 20 to fully inflate and to accommodate wave action with minimal snap loading. The other scroll member (eg. the fore scroll member 50) is not spring loaded, but may be scrolled. Therefore, when one section of the outer seal member 24 becomes worn (ie. that section which contacts the water surface), the outer seal member 24 may be advanced (scrolled) to expose a different section to the water surface. When substantially all of the sheet has been worn, the entire outer seal member 24 may be easily and quickly replaced with a new sheet.

The present seal provides much improved air cushion and hullborne operation characteristics. During air cushion operation, the webbed, bag like structure provides better pitch restoring forces, thereby improving seakeeping with reduced drag. The outer seal member 24 further reduces drag, providing a smooth, low friction contact with the water surface. The outer seal member 24 also eliminates the "flutter" induced wear of conventional seal fingers. During hullborne operation, each seal 20, 21 is pulled tight to the hull 13, providing greater clearance, resulting in reduced drag, greater speed, and increased maneuverability. The present seal also provides efficient inexpensive maintenance.

Numerous modifications and variations of the present invention are possible in light of the above teachings. It is therefore to be understood that within the scope of the appended claims, the invention may be practiced otherwise than as specifically described herein.

We claim:

1. A seal for a Surface Effect Ship, comprising:
    an inflatable inner seal member, affixed to and depending from the hull of the Surface Effect Ship, disposed between the sidehulls, and in physical communication therewith;
    means for inflating said inner seal member; and, an outer seal member, composed of a flexible sheet material, scrollably affixed to the ship hull fore and aft of said inner seal member, said outer seal member retractably enclosing said inner seal member in cooperation with said ship hull and sidehulls;
    wherein said means for inflating said inner seal member comprises;
        a source of pressurized air,
        conduit system means for providing fluid communication between said source of pressurized air and said inner seal member and,
        valve means for regulating the flow of air between said source of pressurized air and said inner seal member, disposed within said conduit system means, for inflating and deflating said inner seal member.

2. The apparatus recited in claim 1, wherein said inflatable inner seal member comprises:
    a trough, having an inverted triangular cross-section rounded at its lower apex;
    two end caps, each having a like triangular geometry and affixed to an end of said trough; and,
    at least one web, transversely disposed within said trough, affixed to the fore and aft wall thereof, and having a like triangular geometry with a truncated lower apex, wherein each web stabilizes the trough structure, segments the trough into seal cells, and provides a channel for fluid communication between adjacent cells at the lower apex.

3. The apparatus recited in claim 2, wherein each inner member joint is reinforced with a joining member, affixed to each of said adjoining members along the length of the joint seam.

4. The apparatus recited in claim 3, wherein each element of said inner seal member is composed of a like flexible sheet material, and said elements are affixed by conventional means.

5. The appartus recited in claim 4, wherein said elements are affixed by gluing.

6. The apparatus recited in claim 4, wherein said elements are affixed by sewing.

7. The apparatus recited in claim 4, wherein said elements are composed of neoprene impregnated nylon sheeting.

8. The apparatus recited in claim 2, further comprising:
    two friction bearing members, each having a triangular geometry similar to said end caps, and laminated thereto, wherein each friction bearing member is disposed between an end cap and a sidehull to reduce wear from friction therebetween.

9. The apparatus recited in claim 2, wherein the rounded lower apex of said trough is perforated to form ventilation ports, such that the interface between said inner seal member and said outer seal member is lubricated by compressed air emitted from said inner seal member, and wherein any moisture entering said inner seal member may be blown out.

10. The apparatus recited in claim 2, wherein said inner seal member further comprises:
    a rigid framing member, having a central opening;
    a flanged open trough, formed by extending said trough walls and said end caps above said webs, the flange of said open top being folded over said rigid framing member; and,
    wherein said rigid framing member affixes said inner seal member to the hull in an air tight manner and said central opening aligns with said conduit system means.

11. The apparatus recited in claim 10, wherein the rigid framing member is affixed the hull by bolting.

12. A seal for a Surface Effect Ship, comprising:
an inflatable inner seal member, affixed to and depending from the hull of the Surface Effect Ship, disposed between the sidehulls, and in physical communication therewith;
means for inflating and deflating said inner seal member; and,
an outer seal member, composed of a flexible sheet material, scrollably affixed to the ship hull fore and aft of said inner seal member, said outer seal member retractably enclosing said inner seal member in cooperation with said ship hull and sidehulls thereby allowing retraction of said outer seal member upon inner seal member deflation.

13. The apparatus recited in claim 12, wherein said inner seal member and said outer seal member are composed of a like flexible sheet material.

14. The apparatus recited in claim 12, wherein said means for inflating said inner seal member comprises:
a source of pressurized air;
conduit system means for providing fluid communication between said source of pressurized air and said inner seal member; and
valve means for regulating the flow of air between said source of pressurized air and said inner seal member, disposed within said conduit system means.

15. The apparatus recited in claim 14, wherein said inflatable inner seal member comprises:
a trough, having an inverted triangular cross-section, rounded at its lower apex;
two end caps, each having a like triangular geometry and affixed to an end of said trough; and,
at least one web, transversely disposed within said trough, affixed to the fore and aft wall thereof, and having a like triangular geometry with a truncated lower apex, wherein each web stabilizes the trough structure, segments the trough into seal cells, and provides a channel for fluid communication between adjacent cells at the lower apex.

16. The apparatus recited in claim 15, wherein each inner member joint is reinforced with a joining member, affixed to each of said adjoining members along the length of the joint seam.

17. The apparatus recited in claim 16, wherein each element of said inner seal member is composed of a like flexible sheet material, and said elements are affixed by conventional means.

18. The apparatus recited in claim 17, wherein said elements are affixed by gluing.

19. The apparatus recited in claim 17, wherein said elements are affixed by sewing.

20. The apparatus recited in claim 17, wherein said elements are composed of neoprene impregnated nylon sheeting.

21. The apparatus recited in claim 15, further comprising:
two friction bearing members, each having a triangular geometry similar to said end caps, and laminated thereto, wherein each friction bearing member is disposed between an end cap and sidehull to reduce wear from friction therebetween.

22. The apparatus recited in claim 15, wherein the rounded lower apex of said trough is perforated to form ventilation ports, such that the interface between said inner seal member and said outer seal member is lubricated by compressed air emitted from said inner seal member, and wherein any moisture entering said inner seal member may be blown out.

23. The apparatus recited in claim 15, wherein said inner seal member further comprises:
a rigid framing member, having a central opening;
a flanged open trough, formed by extending said trough walls and said end caps above said webs, the flange of said open top being folded over said rigid framing member; and,
wherein said rigid framing member affixed said inner seal member to the hull in an air tight manner and said central opening aligns with said conduit system means.

24. The apparatus recited in claim 23, wherein the rigid framing member is affixed the hull by bolting.

25. The apparatus recited in claim 12, wherein said outer seal member is scrollably affixed to the hull by a pair of rollers, disposed fore and aft of said inner seal member.

26. The apparatus recited in claim 25, wherein at least one of said rollers is spring loaded, said outer seal member being thereby biased in the scrolled-up position, said bias being counteracted by the inflation force of said inner seal member, and wherein said spring load and said inflation force are balanced to allow the passage of waves with minimum snap loading.

27. The apparatus recited in claim 25, wherein said rollers are disposed in recesses in the hull structure.

28. The apparatus recited in claim 12, wherein said means for inflating said inner seal member comprises:
a source of pressurized air;
conduit system means for providing fluid communication between said source of pressurized air and said inner seal member; and,
valve means for regulating the flow of air between said source of pressurized air and said inner seal member, disposed within said conduit system means, for inflating and deflating said inner seal member.

29. The apparatus recited in clam 28, wherein said inflatable inner seal member comprises:
a trough, having an inverted triangular cross-section, rounded at its lower apex;
two end caps, each having a like triangular geometry and affixed to an end of said trough; and,
at least one web, transversely disposed within said trough, affixed to the fore and aft wall thereof, and having a like triangular geometry with a truncated lower apex, wherein each web stabilizes the trough structure, segments the trough into seal cells, and provides a channel for fluid communication between adjacent cents at the lower apex.

30. The apparatus recited in claim 29, wherein each inner member joint is reinforced with a joining member, affixed to each of said adjoining members along the length of the joint seam.

31. The apparatus recited in claim 30, wherein each element of said inner seal member is composed of a like flexible sheet material, and said elements are affixed by conventional means.

32. The apparatus recited in claim 31, wherein said elements are affixed by gluing.

33. The apparatus recited in claim 31, wherein said elements are affixed by sewing.

34. The apparatus recited in claim 31, wherein said elements are composed of neoprene impregnated nylon sheeting.

35. The apparatus recited in claim 29, further comprising:
  two friction bearing members, each having a triangular geometry similar to said end caps, and laminated thereto, wherein each friction bearing member is disposed between an end cap and a sidehull to reduce wear from friction therebetween.

36. The apparatus recited in claim 27, wherein the rounded lower apex of said trough is perforated to form ventilation ports, such that the interface between said inner seal member and said outer seal member is lubricated by compressed air emitted from said inner seal member, and wherein any moisture entering said inner seal member may be blown out.

37. The apparatus recited in claim 29, wherein said inner seal member further comprises:
  a rigid framing member, having a central opening;
  a flanged open trough, formed by extending said trough walls and said end caps above said webs, the flange of said open top being folded over said rigid framing member; and,
  wherein said rigid framing member affixes said inner seal member to the hull in an air tight manner and said central opening aligns with said conduit system means.

38. The apparatus recited in claim 37, wherein the rigid framing member is affixed the hull by bolting.

* * * * *